(12) United States Patent
Pfisterer et al.

(10) Patent No.: US 8,224,536 B2
(45) Date of Patent: Jul. 17, 2012

(54) METHOD FOR CONTROLLING A SHIFT POINT IN AN AUTOMATIC TRANSMISSION

(75) Inventors: Markus Pfisterer, Puchheim (DE); Arman Kara, Eching (DE)

(73) Assignee: Beyerische Motoren Werke Aktiengesellschaft, Munich (DE)

( * ) Notice: Subject to any disclaimer, the term of this patent is extended or adjusted under 35 U.S.C. 154(b) by 439 days.

(21) Appl. No.: 12/463,805

(22) Filed: May 11, 2009

(65) Prior Publication Data
US 2009/0287385 A1 Nov. 19, 2009

(30) Foreign Application Priority Data
May 15, 2008 (DE) .......................... 10 2008 023 805

(51) Int. Cl.
*G06F 7/00* (2006.01)
(52) U.S. Cl. .......................................... 701/51; 701/66
(58) Field of Classification Search ................ 701/22, 701/51, 66
See application file for complete search history.

(56) References Cited

U.S. PATENT DOCUMENTS

| | | | |
|---|---|---|---|
| 5,103,398 A | 4/1992 | Akiyama | |
| 5,605,519 A | 2/1997 | Seidel et al. | |
| 5,772,556 A | 6/1998 | Tinschert et al. | |
| 6,370,464 B1 | 4/2002 | Herbster et al. | |
| 6,793,027 B1 * | 9/2004 | Yamada et al. | 180/65.1 |
| 6,823,954 B2 * | 11/2004 | Shimabukuro et al. | 180/65.25 |
| 7,223,200 B2 * | 5/2007 | Kojima et al. | 477/3 |
| 7,282,008 B2 * | 10/2007 | Oshidari | 477/4 |
| 7,935,024 B2 | 5/2011 | Winkel et al. | |
| 2008/0119975 A1 * | 5/2008 | Yamazaki et al. | 701/22 |
| 2009/0248265 A1 * | 10/2009 | Tabata et al. | 701/59 |

FOREIGN PATENT DOCUMENTS

| | | |
|---|---|---|
| DE | 4111644 A1 | 10/1992 |
| DE | 4130265 A1 | 3/1993 |
| DE | 4337957 A1 | 5/1994 |
| DE | 102007060161 A1 | 6/2009 |

* cited by examiner

*Primary Examiner* — Hussein A. Elchanti
(74) *Attorney, Agent, or Firm* — Barley Snyder

(57) ABSTRACT

The method according to the invention for shift point control in automatic transmissions by means of an electronic control device, which receives a performance requirement value and the vehicle speed as input signals and triggers up-shifts and down-shifts, by means of a functional module. The functional module controls the shift point, by using characteristic shift curves stored in the control device as a function of the performance requirement value and the vehicle speed. When predetermined operating conditions apply, a speed range is defined below a defined vehicle speed, in which range an instantaneous down-shift is performed, which is independent of the currently applicable characteristic shift curve. As soon as the performance requirement value or an operating value proportional to the performance requirement value falls below a threshold, an up-shift subsequent to the down-shift is delayed by a first predetermined time period after the instantaneous down-shift.

20 Claims, 1 Drawing Sheet

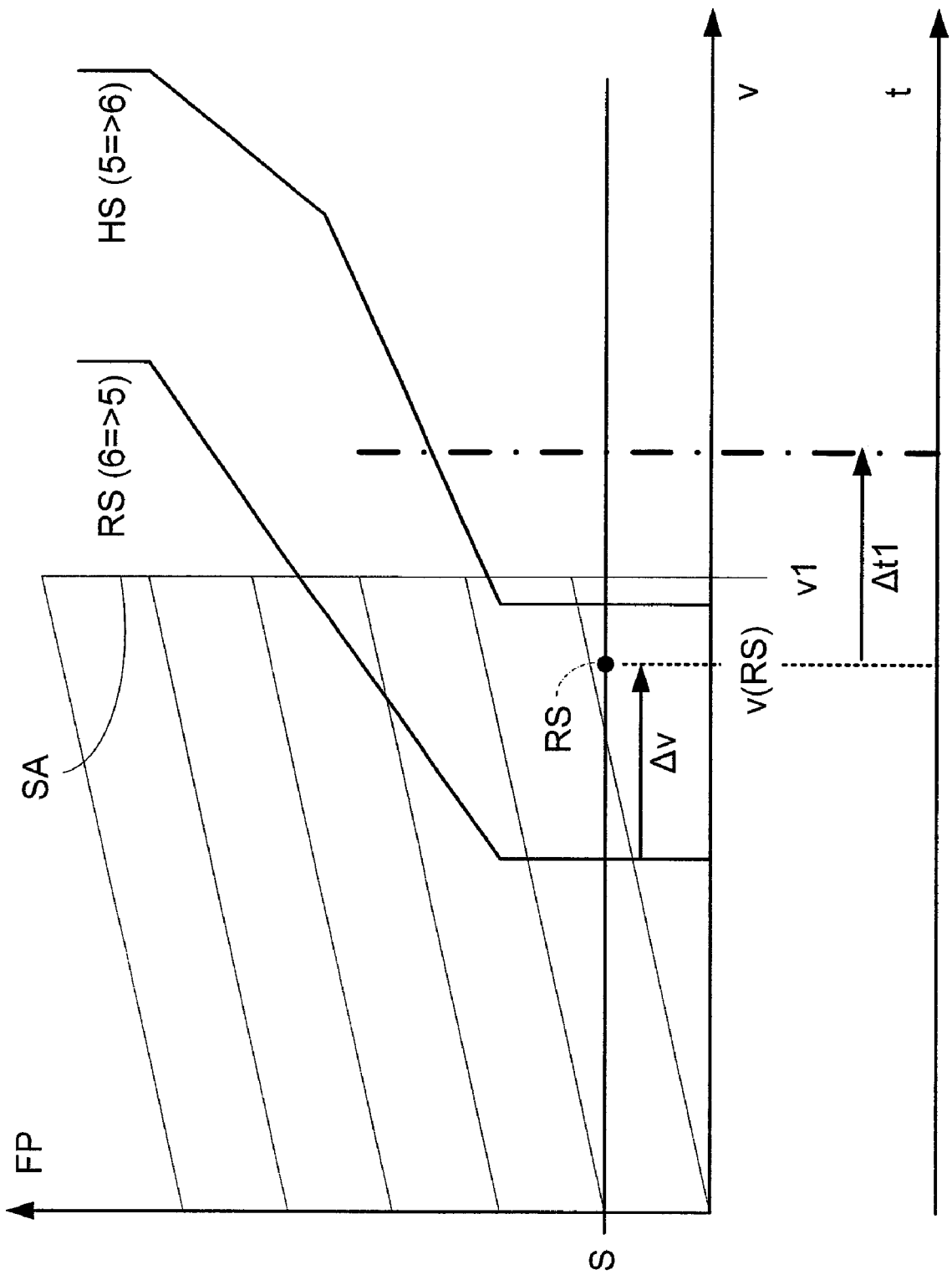

METHOD FOR CONTROLLING A SHIFT POINT IN AN AUTOMATIC TRANSMISSION

CROSS-REFERENCE TO RELATED APPLICATIONS

This application claims the benefit of the filing date under 35 U.S.C. §119(a)-(d) of German Patent Application No. 102008023825, filed on May 15, 2008.

FIELD OF THE INVENTION

The invention relates to a method for controlling a shift point in an automatic transmission.

BACKGROUND

Methods for controlling the shift point in an automatic transmission are readily known. For example, DE 39 27 349 C2 describes one such method that includes characteristic curves with different up-shift and down-shift hystereses, so as largely to avoid rapid shifting back and forth between two gears. This method is also disclosed throughout the application as a basic known shift point control method.

Normally, an individual characteristic shift field, with characteristic shift curves, is stored for gear shift control in each operating situation, at the driver's specification or by recognizing a particular driving situation. In general, the down-shift is typically established with a particular hysteresis depending on a required up-shift when accelerating. However, in the case of subsequent deceleration, the shift point may be so low that a possible fuel-saving throttle cut-off of the drive motor (internal combustion engine in particular), in particular an unfueled throttle cut-off, is deactivated under some circumstances. As a result, unnecessary fuel consumption occurs.

SUMMARY

An object of the invention, among others, is to provide an improved method for controlling the shift point in automatic transmissions, which is particularly suitable for reducing fuel consumption.

This and other objectives are achieved according to the invention through a method for controlling the shift point in automatic transmissions by means of an electronic control device, which receives a performance requirement value (FP) and the vehicle speed (v) as input signals. The input signals trigger up-shifts and down-shifts through a functional module for controlling the shift point. Characteristic shift curves stored in the control device are used, as a function of the performance requirement value (FP) and the vehicle speed (v). A speed range (SA) is then defined below a defined vehicle speed (v1), more specifically when predetermined operating conditions apply. In this range, an instantaneous down-shift (RS) is performed, independent of the currently applicable characteristic shift curve, as soon as the performance requirement value (FP) or an operating value proportional to the performance requirement value (FP) falls below a threshold (S), and an up-shift (HS) subsequent to the down-shift (RS) is delayed by a first predetermined time period ($\Delta t1$) after the instantaneous down-shift (RS).

BRIEF DESCRIPTION OF THE DRAWINGS

The invention will now be described in detail with reference to an embodiment.

FIG. 1 is a graph illustrating a gear shift according to the invention, in the form of a down-shift from sixth to fifth gear and a subsequent possible up-shift from fifth to sixth gear.

DETAILED DESCRIPTION OF THE EMBODIMENT(S)

In the method according to the invention, a electronic control device (not shown in greater detail), which activates actuators of an automatic transmission as a function of various input signals in a known manner, is used. The electronic control device (not shown) receives a vehicle speed v and a performance requirement value, for example an accelerator pedal position FP, specified by the driver, in addition to other input signals, likewise in a known manner. By means of a functional module, in the form of hardware and software, for controlling the shift point, the electronic control device actuates up-shifts and down-shifts using characteristic shift curves stored in the electronic control device as a function of the performance requirement value FP and the vehicle speed v. FIG. 1 shows a detail of stored shift curves, in accordance with which an example of a characteristic down-shift curve RS (6=>5) from sixth to fifth gear and a characteristic up-shift curve HS (5=>6) from fifth to sixth gear is schematically shown.

According to the invention, when predetermined operating conditions apply, a speed range SA (see hatched area) is defined below a defined vehicle speed v1. An instantaneous down-shift RS (see point) is performed in this speed range SA, independent of the currently applicable characteristic shift curve RS (6=>5), as soon as the performance requirement value FP falls below a threshold S. After this instantaneous down-shift RS, an up-shift subsequent to the down-shift RS is preferably delayed for a first predetermined time period $\Delta t1$, in this case in accordance with the characteristic up-shift curve HS (5=>6). After an up-shift, the next down-shift, for example triggered by characteristic shift curves or a particular function, is preferably delayed for a second predetermined time period (not shown).

The predetermined operating conditions, for defining of the defined vehicle speed (v1) or of the speed range SA within which the instantaneous down-shift RS is performed when the threshold S is not attained, are preferably operating values by means of which a process of acceleration is recognized, for example, a particular gear, a particular minimum gradient of the accelerator pedal value FP, and/or a particular minimum vehicle speed v.

In the embodiment shown, the threshold S and/or the first predetermined time period $\Delta t1$ are determined in such a way that an unfueled coasting mode is enabled, for example for an empirically determined minimum time appropriate for fuel consumption. The threshold S may, for example, be based (as shown) on the performance requirement signal FP, the engine torque or even the engine speed.

If the down-shift point RS is "increased", in terms of speed, by a vehicle speed offset $\Delta v$, resulting from non-attainment of the threshold S, the hysteresis function according to the invention also delays the up-shift point by a first predetermined time period $\Delta t1$. Otherwise, the down-shift point might lie above the up-shift point. Moreover, the next up-shift may also be delayed by the second predetermined time period to avoid oscillating shifts.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method for controlling the shift point in an automatic transmission by means of an electronic control device, comprising the steps of:
   receiving a performance requirement value and a vehicle speed as input signals;
   triggering up-shifts and down-shifts, by a functional module for controlling the shift point;
   using characteristic shift curves stored in the control device as a function of the performance requirement value and the vehicle speed;
   defining a speed range independent of the currently applicable characteristic shift curve and below a defined vehicle speed when predetermined operating conditions apply, in which range an instantaneous down-shift is performed, independent of the currently applicable characteristic shift curve, when the performance requirement value falls below a threshold, and
   performing an up-shift subsequent to the down-shift delayed by a first predetermined time period after the instantaneous down-shift.

2. The method according to claim 1, wherein the predetermined operating conditions are operating values indicative of acceleration.

3. The method according to claim 2, wherein the threshold is predetermined to enable an unfueled coasting mode.

4. The method according to claim 3, wherein the first predetermined time period is predetermined to enable an unfueled coasting mode.

5. The method according to claim 2, wherein the first predetermined time period is predetermined to enable an unfueled coasting mode.

6. The method according to claim 1, further comprising the step of:
   delaying a next down-shift for a second predetermined time period after an up-shift.

7. The method according to claim 4, further comprising the step of:
   delaying a next down-shift for a second predetermined time period after an up-shift.

8. The method according to claim 5, further comprising the step of:
   delaying a next down-shift for a second predetermined time period after an up-shift.

9. A method for controlling a shift point in an automatic transmission by means of an electronic control device, comprising the steps of:
   receiving a performance requirement value and a vehicle speed as input signals;
   triggering up-shifts and down-shifts, by a functional module for controlling the shift point;
   using characteristic shift curves stored in the control device as a function of the performance requirement value and the vehicle speed (v);
   defining a speed range independent of the currently applicable characteristic shift curve and below a defined vehicle speed when predetermined operating conditions apply, in which range an instantaneous down-shift is performed, independent of the currently applicable characteristic shift curve, when an operating value proportional to the performance requirement value falls below a threshold, and
   performing an up-shift subsequent to the down-shift delayed by a first predetermined time period after the instantaneous down-shift.

10. The method according to claim 9, wherein the predetermined operating conditions are operating values indicative of acceleration.

11. The method according to claim 10, wherein the threshold is predetermined to enable an unfueled coasting mode.

12. The method according to claim 11, wherein the first predetermined time period is predetermined to enable an unfueled coasting mode.

13. The method according to claim 10, wherein the first predetermined time period is predetermined to enable an unfueled coasting mode.

14. The method according to claim 9, further comprising the step of:
   delaying a next down-shift for a second predetermined time period after an up-shift.

15. The method according to claim 12, further comprising the step of:
   delaying a next down-shift for a second predetermined time period after an up-shift.

16. The method according to claim 13, further comprising the step of:
   delaying a next down-shift for a second predetermined time period after an up-shift.

17. A method for controlling the shift point in an automatic transmission by an electronic control device, comprising the steps of:
   receiving an accelerator pedal position and a vehicle speed as input signals;
   referencing characteristic shift curves stored in the control device, the characteristic shift curves being a function of the accelerator pedal position and the vehicle speed;
   defining a speed range encompassing least portions of both sides of a characteristic shift curve; and
   performing an instantaneous down-shift independent of the characteristic shift curve when the accelerator pedal position falls below a threshold and vehicle speed is within the speed range.

18. The method of claim 17 further comprising performing an up-shift subsequent to the down-shift delayed by a first predetermined time period after the instantaneous down-shift.

19. The method according to claim 18, wherein the first predetermined time period is predetermined to enable an unfueled coasting mode.

20. The method according to claim 18, further comprising delaying a next down-shift for a second predetermined time period after an up-shift.

* * * * *

UNITED STATES PATENT AND TRADEMARK OFFICE
CERTIFICATE OF CORRECTION

| | | |
|---|---|---|
| PATENT NO. | : 8,224,536 B2 | Page 1 of 1 |
| APPLICATION NO. | : 12/463805 | |
| DATED | : July 17, 2012 | |
| INVENTOR(S) | : Pfisterer et al. | |

It is certified that error appears in the above-identified patent and that said Letters Patent is hereby corrected as shown below:

In Column 3, Row 54 "down-shills" should read --down-shifts--.

Signed and Sealed this
Fifteenth Day of January, 2013

David J. Kappos
*Director of the United States Patent and Trademark Office*